United States Patent
Simkhay et al.

(10) Patent No.: US 8,549,392 B2
(45) Date of Patent: Oct. 1, 2013

(54) CUSTOMIZABLE SPREADSHEET TABLE STYLES

(75) Inventors: Roy Simkhay, Seattle, WA (US); David F. Gainer, Redmond, WA (US); Tom J. Hoke, Sammamish, WA (US); Benjamin C. Chamberlain, Redmond, WA (US); Paavany Jayanty, Bellevue, WA (US); Charles D. Ellis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1041 days.

(21) Appl. No.: 11/214,561

(22) Filed: Aug. 30, 2005

(65) Prior Publication Data

US 2007/0050699 A1 Mar. 1, 2007

(51) Int. Cl.
*G06F 17/00* (2006.01)
*G06F 17/24* (2006.01)

(52) U.S. Cl.
CPC ................................. *G06F 17/246* (2013.01)
USPC .......................................................... 715/212

(58) Field of Classification Search
CPC .................................................... G06F 17/246
USPC ................ 715/200, 212–214, 217–220, 227, 715/838, 845–846
See application file for complete search history.

(56) References Cited

U.S. PATENT DOCUMENTS

| | | | | |
|---|---|---|---|---|
| 5,379,372 A | * | 1/1995 | Wu | 715/236 |
| 5,680,557 A | * | 10/1997 | Karamchetty | 715/866 |
| 5,914,714 A | * | 6/1999 | Brown | 715/866 |
| 5,966,123 A | | 10/1999 | Kaplan | |
| 6,384,923 B1 | | 5/2002 | Lahey | |
| 6,438,565 B1 | | 8/2002 | Ammirato | |
| 6,626,959 B1 | * | 9/2003 | Moise et al. | 715/210 |
| 6,640,234 B1 | * | 10/2003 | Coffen et al. | 715/219 |
| 6,912,690 B2 | | 6/2005 | Bauchot | |
| 7,849,395 B2 | * | 12/2010 | Ellis et al. | 715/212 |
| 2003/0097383 A1 | * | 5/2003 | Smirnov et al. | 707/204 |
| 2005/0054381 A1 | * | 3/2005 | Lee et al. | 455/557 |

FOREIGN PATENT DOCUMENTS

| | | |
|---|---|---|
| JP | 10-187679 | 7/1998 |
| WO | 01/47187 | 6/2001 |

OTHER PUBLICATIONS

'Using Quattropro for Windows, Special Edition', 1994, Que, pp. 793-799.*
Excel 03 formatting screendumps, 2003, Microsoft, fig.1-3.*
'Using Quattropro for Windows, Special Edition', hereinafter Quattro, 1994, Que, pp. 204-215.*
Young, et al., "Microsoft Office 2003 Inside Out", applies to Excel 2003, published Sep. 2003, p. 1-3, retrieved from http://office.microsoft.com/en-us/excel-help/using-styles-in-excel-HA001110199.aspx.*

(Continued)

*Primary Examiner* — Amelia Rutledge
(74) *Attorney, Agent, or Firm* — L. Alan Collins; Collins & Collins Intellectual, LLC

(57) ABSTRACT

Table styles provide a way to format an entire spreadsheet table quickly and easily. According to described implementations, table styles can be created and customized for repeated use in a spreadsheet application. As a result, a user does not have to manually modify multiple formatting options for each table included in one or more spreadsheets. A graphical user interface is also described that provides simple user access to existing table styles that can be modified according to the user's requirements.

22 Claims, 8 Drawing Sheets

(56) References Cited

OTHER PUBLICATIONS

Teacup Software, "User Guide, TableStyles and CellStyles 1.1", p. 1-18, retrieved from internet Jan. 2013.*

Adobe InDesign, "Table Strokes and fills", p. 1-4, retrieved from http://help.adobe.com/en_US/indesign/cs/using/WSa285fff53dea4f8617383751001ea8cb3f-6fc1a.html, Jan. 2013.*

Stinson, "Microsoft Office Excel 2003 Inside Out", Microsoft Press, Redmond, Washington, pp. 198-200, 2004.

EP Supplementary Search Report, Ref EP 56422TE900aha, for Application No. 06790084.5-1527 / 1920349 PCT/US2006033804, date Dec. 14, 2011, 7 pages.

"Notice of Rejection", JP Application No. 2008-529217, Jan. 13, 2012, 6 pages.

MX Office Action for Application No. MX/a/2008/002891, Reference 312948.12, Jun. 12, 2012, 8 pages.

Sawamura, "In-depth explanation of Ichitaro Office 8", Windows Start. vol. 2, No. 10, pp. 28-31, Mainichi Communications, Inc., Aug. 29, 1997.

Yamazaki, "Sanshiro 8 Expert Training Program—Q&A for useful functions (I)", Just MOAI, No. 111, pp. 66-69, JustSystem Corp., Aug. 15, 1998.

PCT Search Report Ref 312948.02 WO, for application No. PCT/US2006/033804, mailed Dec. 29, 2006.

CN First Office Action for Application No. 200680031440.7, May 8, 2009, 19 pages.

CN Second Office Action for Application No. 200680031440.7, Nov. 6, 2009, 10 pages.

AU Examiner's first report for application No. 2006284906, Nov. 17, 2010, 2 pages.

KR Notice of Preliminary Rejection for Application No. 10-2008-7003222, Reference 312948.06, Apr. 30, 2013, 9 pages.

MX Office Action for Application No. MX/a/2008/002891, Jun. 20, 2013, 11 pages.

* cited by examiner

Pivot Table
Formattable Elements

CUSTOMIZABLE SPREADSHEET TABLE STYLES

BACKGROUND

Tables can be used in a spreadsheet application to display and summarize data to a reader in an organized, comprehendible and attractive manner. To accomplish this, spreadsheet tables may include—in addition to listing data—distinct sections such as header rows, subtotals rows, totals rows, highlighted columns and/or rows, shaded columns and/or rows, borders, linear delineations, etc.

One way to accomplish such table formatting is for a user to manually format different sections of a table to create a functional and attractive look. However, if a spreadsheet or set of spreadsheets contains multiple tables, such manual formatting becomes tedious and time consuming. To ease this burden somewhat, a spreadsheet application may include a function that predefines a table format. Then, a user must merely apply a predefined format to a table.

However, predefined table formats may not suit a user's exact requirements. If a user wants to create a customized table format with current spreadsheet applications, the user must either manually format spreadsheet tables from scratch or apply manual alterations to a predefined table format. Either method requires significant time and effort. For example, if a user prepares a spreadsheet that includes ten tables and the user wants all the tables to look alike, the user must either manually format all ten tables or format each table according to a predefined table format and then manually modify each of the ten tables.

SUMMARY

The present disclosure describes a framework that allows users to create a customized table style that can be saved and easily applied to any number of tables in one or more spreadsheets. Like predefined table formats, once a user has created a customized table style, the format of the customized table style can be applied to tables of data with a minimum of effort to instantly transform the data tables into easily readable and recognizable tables.

When creating a customized table style, distinct sections of a table can be formatted separately from other sections of the table and such sections may be formatted as a single element. Therefore, individual cells in a table do not have to be formatted separately. A row of header cells, for example, can be formatted separately from other table cells. A precedence order of table elements may be established and/or modified to indicate which table element format takes precedence when two or more table elements intersect.

Also described herein are one or more graphical user interfaces through which a user can easily create, save and apply customized table styles.

BRIEF DESCRIPTION OF THE DRAWINGS

The foregoing and other aspects of the subject matter disclosed herein will become more readily appreciated and will become better understood by reference to the following detailed description, when taken in conjunction with the accompanying drawings, wherein.

DETAILED DESCRIPTION

Overview

Figure 1:
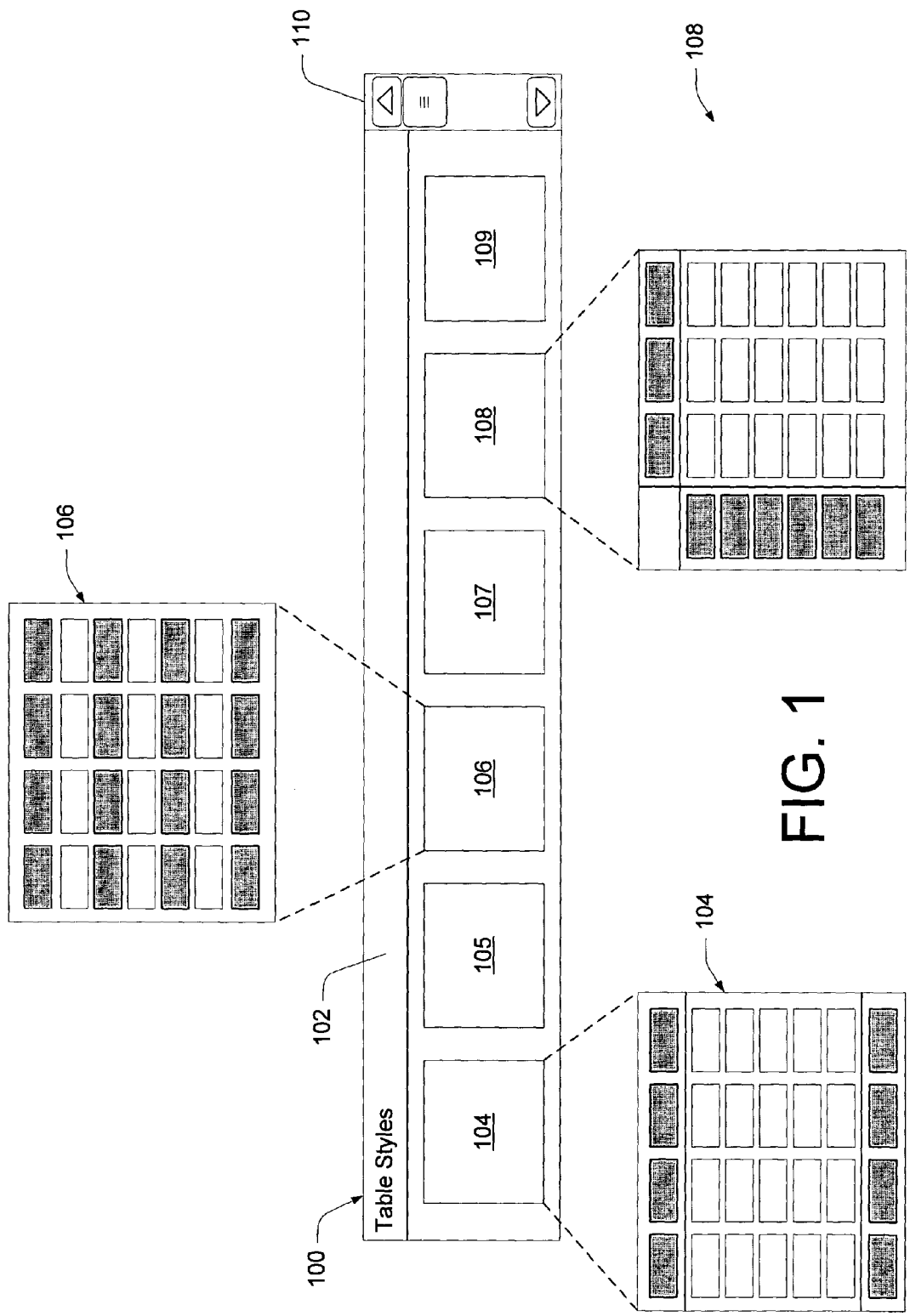
FIG. 1 depicts an exemplary table styles toolbar in accordance with the present description.

The presently described subject matter relates to techniques for creating customized spreadsheet table styles. As used herein, the term "table style" includes any type of table style such as, for example, pivot table styles. Pivot table styles and/or pivot table reports are typically more complicated than standard spreadsheet styles and reports and may include subtotal row(s), a grand total row, row subheadings, column subheadings, etc. Pivot table reports allow a user to view table data from various axes and provide a useful tool for viewing data.

One way that is described herein to create a custom table style is to access a previously defined table style, such as a predefined table format or another custom table style. Modifications are made to the previously defined table style and the modified table style is saved under a unique table style name. Thereafter, a user may create a table of the new table style or may reformat existing tables according to the new table style and the user does not have to manually format each table to achieve a particular appearance.

One feature that is described herein is one that separates a table style into separate areas, or elements. Each of the separate elements can be formatted apart from other areas. This allows all cells in an area to be formatted together instead of having to format each cell separately, thus saving significant time and effort. This is useful, for example, to apply a color gradient across a range of cells. Typically, color gradients have only been applied at a cell level, which cannot be properly applied to a group of cells such as a header row. When making modifications to the format of an existing table style, a user must only indicate to which table element subsequent formatting commands apply.

Formattable spreadsheet table elements are also described in U.S. patent application Ser. No. 11/214,682, filed contemporaneously herewith by the present applicants, entitled "Formattable Spreadsheet Table Elements with Automatic Updating." Said application is assigned to Microsoft Corp., the assignee of the present invention.

Customizing spreadsheet table styles is accomplished using a graphical user interface that is described in greater detail below. Through the graphical user interface, a user can conveniently access a table styles toolbar to access existing table styles, edit an existing table style to create a new table style or modify the existing table style, apply a table style to a table, etc. The graphical user interface also indicates which table elements that may be found in a table can be formatted.

The table elements listed in the graphical user interface may be displayed according to a precedence order that indicates which table element formatting is to take precedence in the event that two or more table elements with different formatting intersect. In at least one implementation, the precedence order of the table element list is modifiable so that different precedence orders may be implemented.

These and other features of customizable spreadsheet table styles are described in greater detail below, with respect to the previously described figures.

Exemplary Table Styles Toolbar

FIG. 1 depicts an exemplary table styles toolbar 100 in accordance with the present description. The table styles toolbar 100 may appear on a typical spreadsheet toolbar (not shown) or it may appear on a spreadsheet user interface (not shown) upon activation of an icon appearing on the user interface. Any manner known in the art for displaying a toolbar in a graphical user interface may be employed to display the exemplary table styles toolbar 100.

The exemplary table styles toolbar 100 includes a title bar 102 that describes the contents of the table styles toolbar 100. In the present example, the title bar 102 includes the title "Table Styles." A number of table styles thumbnail images (hereinafter "thumbnails") 104-109 are shown displayed in the exemplary table styles toolbar 100. Although multiple table styles thumbnails 104-109 are shown in the present example, it is noted that only one thumbnail may appear in the table styles toolbar 100. Furthermore, the table styles toolbar 100 may not include any thumbnails if no table styles are defined.

Each of the thumbnails 104-109 depicts a different table style and is presented to a user so that the table style is easily recognizable. In the present example, enlarged versions of thumbnail 104, thumbnail 106 and thumbnail 108 are shown to illustrate how different table styles may be shown in a thumbnail 104-109. Thumbnail 104 includes shading on header and total rows and horizontal line delineators; thumbnail 106 includes shading on alternate rows; and thumbnail 108 includes shading in a header row and a header column.

Implementations may differ as to an appropriate size for the thumbnails 104-109, an appropriate size being a size at which certain formatting features are clearly visible to a user. In the exemplary implementation shown, fill or border table element formatting is shown, but smaller formatting details such as font, etc. are not. In at least one implementation, a thumbnail 104-109 minimum size is 64×48 pixels while a minimum size for the table style shown within a thumbnail is 61×46 pixels. However, it is noted that other sizes may be used as long as certain formatted table elements are visible so as to distinguish one table style from another.

In one or more implementations, a table style may be previewed on a current table when a cursor is placed on a thumbnail 104-109 for a predefined period of time. So if a user wants to see how a particular table would appear according to a certain table style, the user could select the table and then hover the cursor over a thumbnail. After a certain period of time elapsed, the table style shown in the thumbnail over which the cursor is hovered will be temporarily applied to the selected table. The user would then have the choice of selecting the table style to be applied to the table or to remove the cursor from the thumbnail to remove the temporary formatting.

The exemplary table styles toolbar 100 also includes a scroll bar 110. The table styles toolbar 100 may be limited to a predefined width which can be exceeded if more than a certain number of thumbnails are displayed. The scroll bar 110 allows a portion of the thumbnails to be displayed within the predefined width while providing easy access to more thumbnails by actuating the scroll bar 110.

These and other features of the exemplary table styles toolbar 100 will be described in greater detail below, with respect to one or more subsequent figures.

Exemplary Menu With Modify Option

Figure 2:
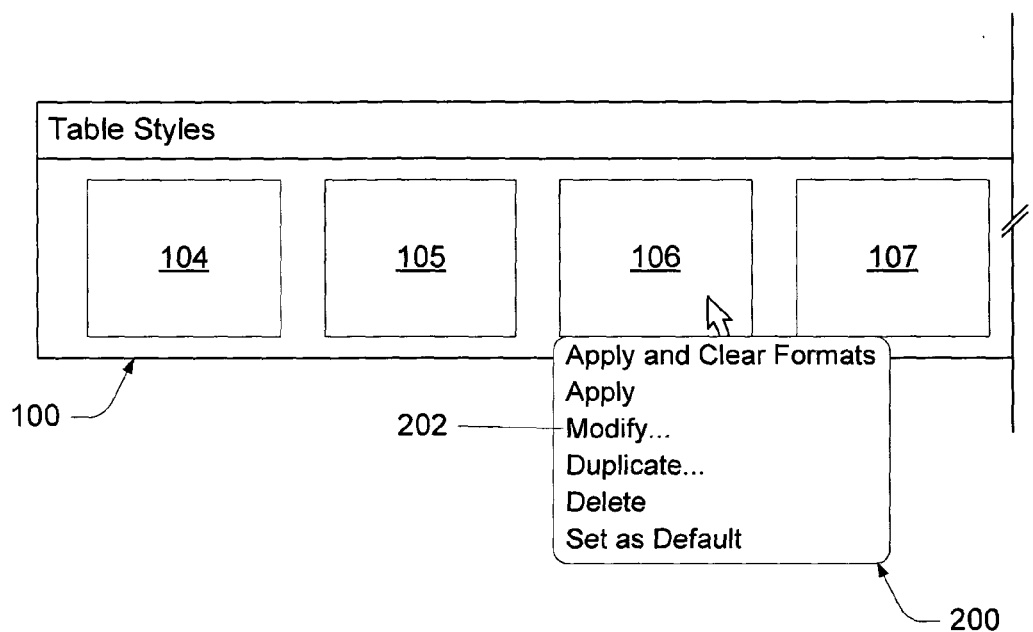
FIG. 2 depicts an exemplary menu associated with the table styles toolbar of FIG. 1, the menu including an option to modify an existing table style.

FIG. 2 depicts an exemplary menu 200 associated with the table styles toolbar 100 of FIG. 1. The menu includes a modify option 202 that is actuated to modify an existing table style. Other options are also included but are not relevant to the present discussion.

The exemplary menu 200 is brought up by some user action, e.g. a right mouse click on one of the thumbnails 104-109. In the present example, a user has activated the exemplary menu 200 by right clicking on thumbnail 106.

From the exemplary menu 200, a user can select the modify option 202 to bring up an interface for modifying an existing format of a table style represented by thumbnail 106. One way in which a new table style can be created is to modify an existing table style through the exemplary menu 200 and the modify option 202 and then save the modified table style as a new table style.

An example of such an interface and use thereof to modify an existing table style is shown and described below, with respect to FIG. 3.

Exemplary Dialog—Modifying a Table Style

Figure 3:
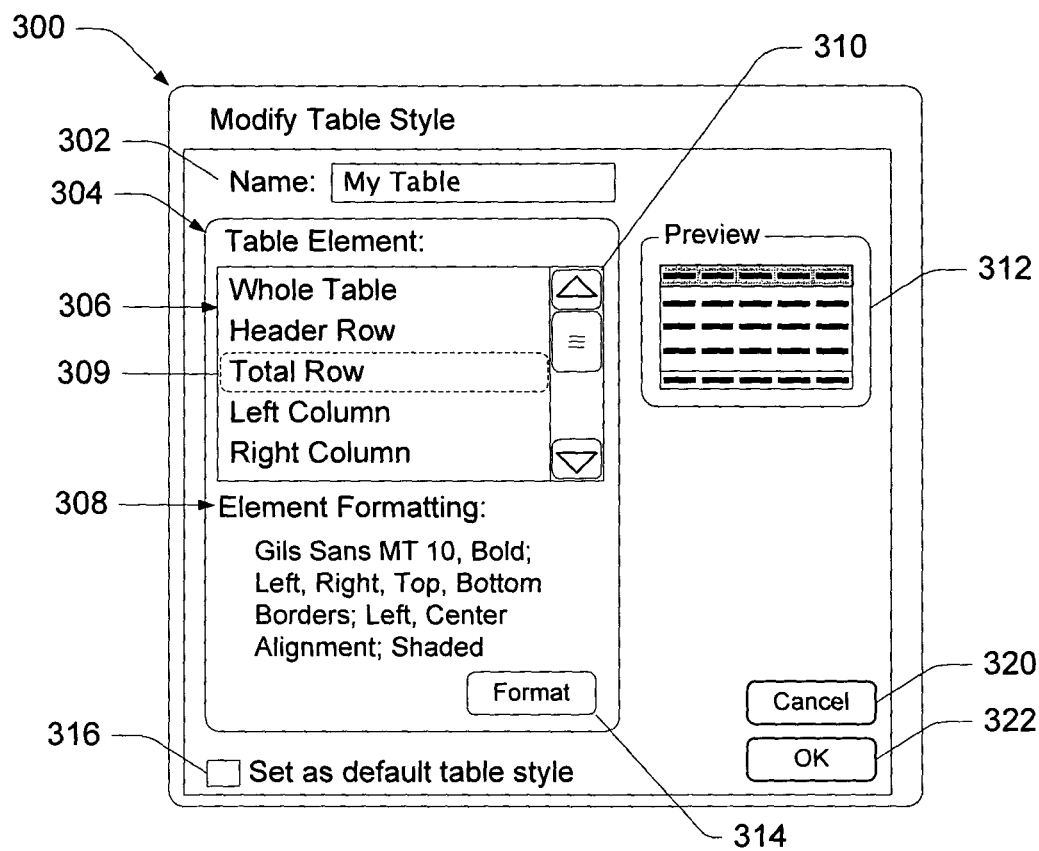
FIG. 3 depicts an exemplary dialog for modifying a table style.

FIG. 3 depicts an exemplary dialog 300 for modifying a table style to change the table style or to create a new table style. The exemplary dialog 300 includes a title bar ("Modify Table Style") 301, a name field 302 and a table element tile 304. The name field 302 provides a place where a user can enter a name for a new table style (likely a modified version of an existing table style). The new table style can then be identified and recalled at any time using the name entered in the name field 302.

The table element tile 304 includes a list of formattable table elements 306 ("Whole Row", "Header Row", "Total Row", etc.) that identify sections of a table that may be formatted distinctly from one or more other sections of the table. The exemplary dialog 300 includes an element formatting section 308 that displays current formatting of a table element currently selected from the list of formattable table elements.

In the example shown in FIG. 3, table element "Total Row" 309 is highlighted. The current formatting for the "Total Row" table element, as shown in the element formatting section 308 includes: Gils Sans MT 10, Bold; Left, Right, Top, Bottom Borders; Left, Center Alignment; Shaded.

Although not explicitly shown here, a table element (such as "Total Row") may be formatted as a single element. For example, if a user wants to apply a color gradient across a total row of cells, the user would select "Total Row" 309 and select a color and/or pattern. The color/and or pattern would be applied across an entire row of cells (e.g. lighter shading in the first cell of the row and darker shading in the last cell of the row) instead of to individual cells (e.g. lighter and darker shading in each cell of the row).

The table element tile 304 also includes a scroll bar 310 for scrolling through the list of table elements, a table style preview thumbnail 312 (hereinafter "preview 312"), and a format button 314. The preview 312 is similar to the thumbnails 104-109 shown in FIG. 1 and is configured to show how a table formatted according to the table style being modified would appear under current element formats.

The format button 314, when actuated, brings up a format screen (not shown) that is typical of productivity software application formatting screens. Such a format screen is used to enter formats for text, borders, lines, cells, etc. When formats are entered, the newly entered formats appear in the element formatting section 308.

The exemplary dialog 300 also includes a default control 316 where a user can set the table style being modified as a default table style for all tables in a spreadsheet or group of spreadsheets. The exemplary dialog 300 also includes a cancel button 320 and an "OK" button 322. If the cancel button 320 is actuated, previously entered changes are discarded and the table style remains in the format that previously existed. When a user wants to save the previously entered format changes, the user actuates the "OK" button 322 to permanently store the changes.

Exemplary Formattable Table Elements

Figure 4:
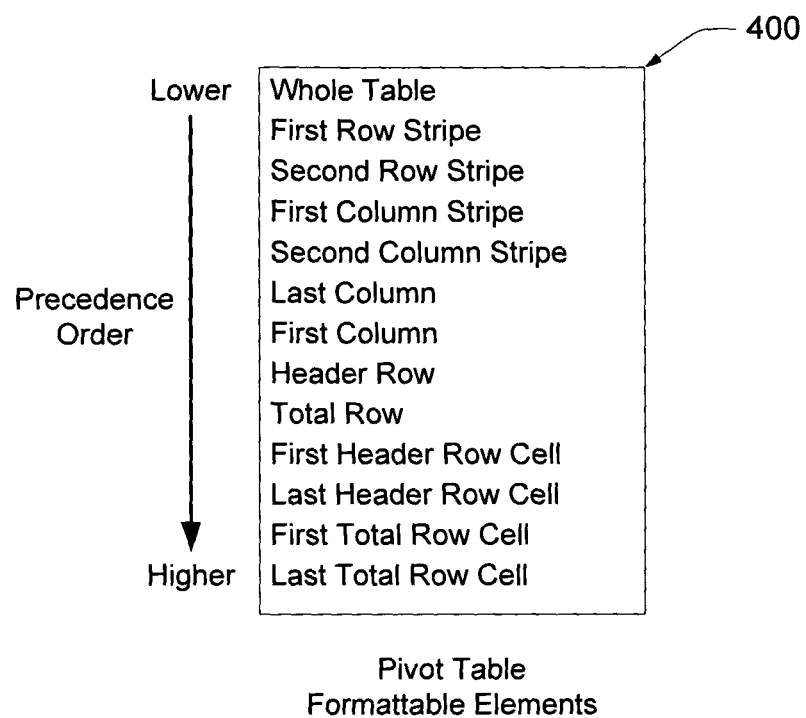
FIG. 4 is an exemplary non-exhaustive listing of table elements that may be formatted via the exemplary dialog shown in FIG. 3.

FIG. 4 is an exemplary non-exhaustive listing 400 of basic table elements that may be formatted via the exemplary dialog shown in FIG. 3. The listing 400 of basic table elements provides basic table elements from simple tables that can be formatted. As previously noted, when a table element is selected, subsequently entered formatting commands are applied to cells contained in the selected table element.

The table elements are shown listed in a precedence order. This order may be user-modifiable or pre-configured as shown or in a different order. A first table element listed below a second table element indicates that the second table element takes precedence over the first table element. If the first and second table elements intersect, then the formatting of the second table element applies to the intersection if the formatting of the first table element is different from the formatting of the second table element.

Although a precedence order corresponds to the elements listing 400, in at least one implementation certain types of formatting does not exclude other types of formatting of the same element. In very many cases, formatting styles will overlap within tables. If the formatting styles are incompatible—e.g. each formatting style deals with element borders—then the precedence order will apply. If, on the other hand, the formatting styles are not incompatible—e.g. bold text and color fill—then both of the overlapping formats can be applied. In the previous example, overlapping elements will have bold text and the specified color fill.

To accomplish such an implementation, compatible formatting styles are identified, e.g. color fill and bold text. When rendering a formatted table style, the precedence order takes effect when two or more overlapping formatting styles are not identified as being compatible with each other.

As noted, the exemplary listing 400 of table elements is not exhaustive. That is, other table elements may be included in the listing in one or more other implementations. A more detailed description of the listed table elements follows.

Whole Table: All cells included in the table.

First Row Stripe: Tables may be formatted with alternating stripe colors/shades. The first row stripe corresponds to odd number rows of the table.

Second Row Stripe: Corresponds to even number rows of the table.

First Column Stripe: Tables may be formatted with alternating column colors/shades. The first column stripe corresponds with odd number columns of the table.

Second Column Stripe: Corresponds to even number columns of the table.

Last Column: Cells included in the last (right-most) column of the table.

First Column: Cells included in the first (left-most) column of the table.

Header Row: The "Title" area of the pivot. All the rows above the data section of the table. Filter dropdowns are included in this element.

Total Row: Cells included in the bottom row of the table.

First Header Row Cell: The first (left-most) cell in the header row (i.e. the first row of the table).

Last Header Row Cell: The last (right-most) cell in the header row of the table.

First Total Row Cell: The first (left-most) cell in the total row (i.e. the last row of the table).

Last Total Row Cell: The last (right-most) cell in the total row of the table.

Exemplary Dialog—Modifying a Pivot Table Style

Figure 5:
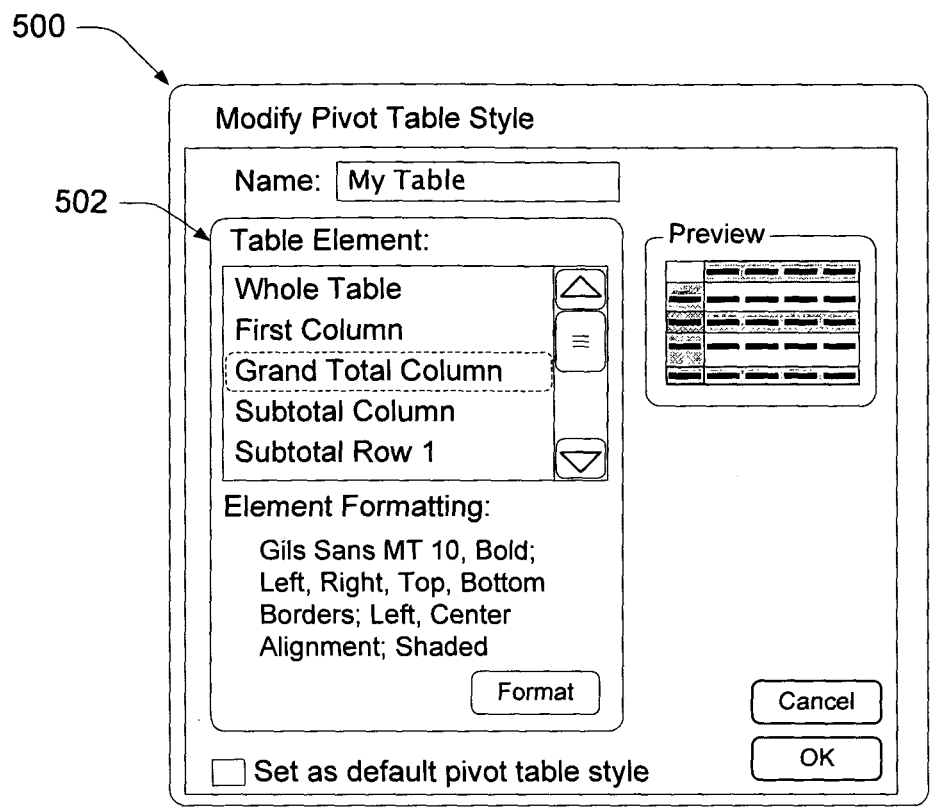
FIG. 5 depicts a dialog for modifying a pivot table style.

FIG. 5 depicts an exemplary dialog 500 for modifying a pivot table style. Exemplary dialog 500 is similar to exemplary dialog 300 shown in FIG. 3 except that exemplary dialog 500 includes additional table elements in a table elements section 502. The table elements shown in the table element section 502 include "Whole Table", "First Column", "Grand Total Column", "Subtotal Column" and "Subtotal Row 1." Other table elements may be displayed and are listed below, in FIG. 6.

Exemplary Extended Formattable Table Elements

Figure 6:
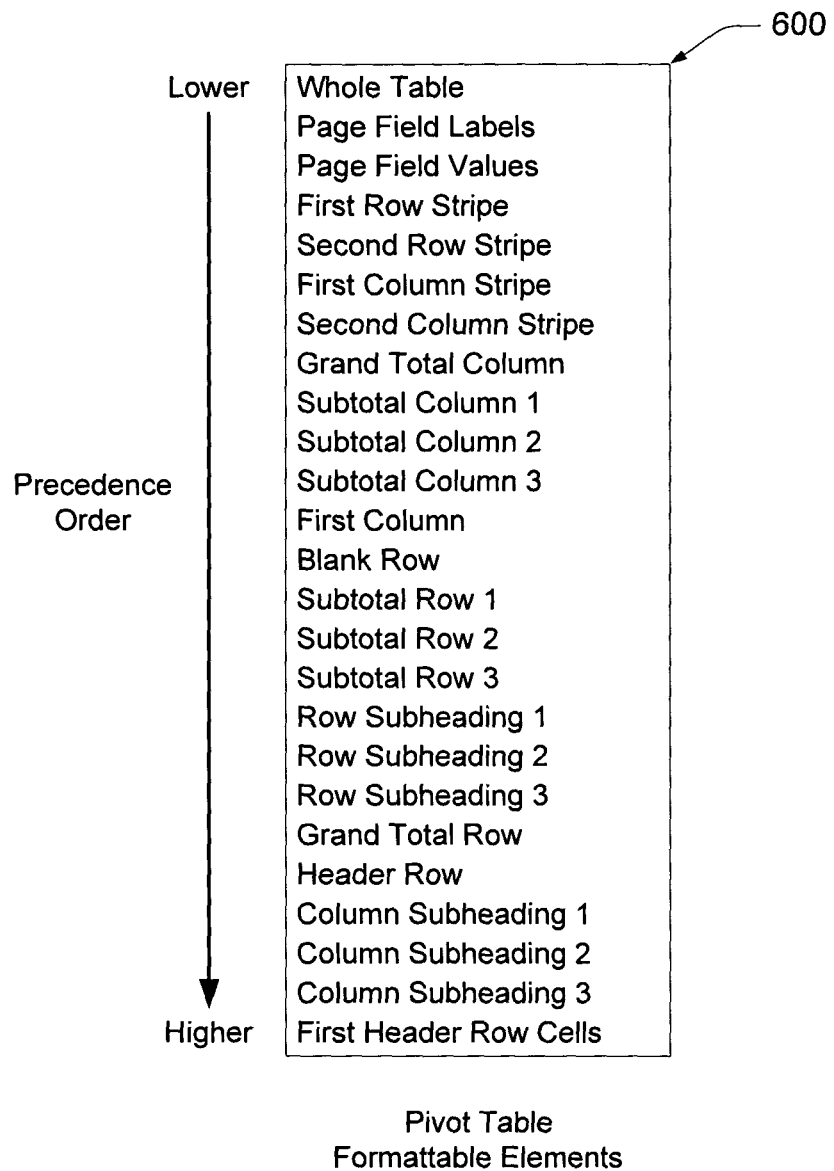
FIG. 6 is an exemplary non-exhaustive listing of pivot table elements that may be formatted via the exemplary dialog shown in FIG. 5.

FIG. 6 is an exemplary non-exhaustive listing 600 of extended table elements that may be formatted via the exemplary dialog shown in FIG. 5. As previously noted, when a table element is selected, subsequently entered formatting commands are applied to cells contained in the selected table element.

The table elements are shown listed in a precedence order. This order may be user-modifiable or pre-configured as shown or in a different order. A first table element listed below a second table element indicates that the second table element takes precedence over the first table element. If the first and second table elements intersect, then the formatting of the second table element applies to the intersection if the formatting of the first table element is different from the formatting of the second table element.

As noted, the exemplary listing 600 of table elements is not exhaustive. That is, other table elements may be included in the listing in one or more other implementations. A more detailed description of the listed table elements follows.

Whole Table: All cells included in the table.

Page Field Labels: Labels next to page field dropdowns.

Page Field Values: Dropdowns for page field items.

First Row Stripe: Tables may be formatted with alternating stripe (row) colors/shades. The first row stripe corresponds to odd number rows of the table.

Second Row Stripe: Corresponds to even number rows of the table.

First Column Stripe: Tables may be formatted with alternating column colors/shades. The first row stripe corresponds to odd number columns of the table.

Second Column Stripe: Corresponds to even number columns of the table.

Grand Total Column: Cells included in the last column of the table. Corresponds to "Last Column" table element (FIG. 4).

Subtotal Column 1: Cells in columns of that table containing subtotals starting at label cell and extended to Grand Total Row. Subtotal Column 1 is outmost subtotal.

Subtotal Column 2: See "Subtotal Column 1". Subtotal Column 2 appears next to Subtotal Column 1 and alternates thereafter with Subtotal Column 3.

Subtotal Column 3: See "Subtotal Column 2."

First Column: Cells included in the first (left-most) column of the table (to the left of the data).

Blank Row: An empty row. Blank rows can be inserted after each item.

Subtotal Row 1: The first level of subtotals.

Subtotal Row 2: The second level of subtotals. After three levels, Subtotal Row 2 and Subtotal Row 3 alternate.

Subtotal Row 3: See "Subtotal Row 2".

Row Subheading 1: Rows of the outer most level of the pivot table that where the field is expanded in the pivot table. All the rows for a field are considered to be expanded if that row is expanded anywhere in the pivot table.

Row Subheading 2: After the first subheading, the subheadings alternate between the 2nd and 3rd subheading formatting. Like Subheading 1, these subheadings are rows of the pivot table that where the field is expanded in the pivot table.

Row Subheading 3: See "Row Subheading 3".

Grand Total Row: Cells included in the bottom row of the table. Corresponds to "Total Row" table element (FIG. 4).

Header Row: The "Title" area of the pivot. All the rows above the data section of the table. Filter dropdowns are included in this element.

Column Subheading 1: Label for the outermost field on columns. Also includes the label of that level's subtotal column.

Column Subheading 2: Label of the second level of fields on columns. Also includes that level's subtotal columns. After the third level, Column Subheading 2 and Column Subheading 3 alternate.

Column Subheading 3: See "Column Subheading 2".

First Header Row Cells: First cells in the top (header) row. Corresponds to "First Header Row Cell" table element (FIG. 4).

Exemplary Methodological Implementation: Customized Table Style Creation

Figure 7:
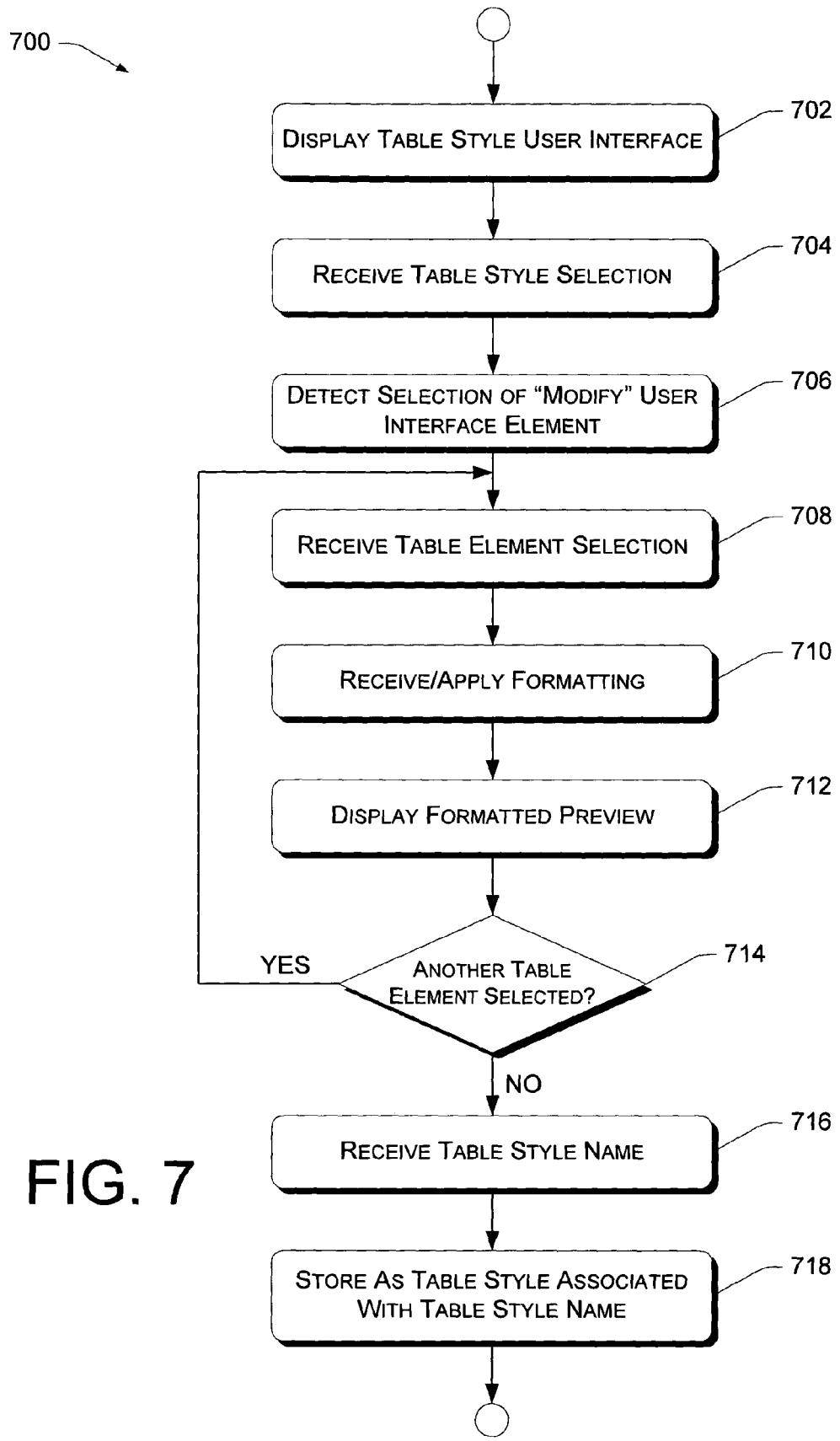
FIG. 7 is a flow diagram depicting an exemplary methodological implementation of creating a customized table style.

FIG. 7 is an exemplary flow diagram depicting an exemplary methodological implementation of creating a customized table style. In the following discussion, continuing reference is made to elements and reference numerals shown in previous figures. It is noted that although certain steps are shown in a particular order in FIG. 7, the steps—or a combination thereof—may be performed in one or more other orders in any particular implementation.

At block 702, the table style toolbar (100, FIG. 1) is displayed to a user. As previously, noted, this display may occur in any of several ways. The table style toolbar 100 may be displayed as a part of a larger graphical user interface or may be displayed in response to actuation of a table style icon. The particular implementation does not matter to the present discussion.

At block 704, a user selection of a table style is received. Any manner known in the art to effect a user selection may be utilized. For example, the selection may be received when the user clicks on a thumbnail (104-109, FIG. 1) of a table style. Thereafter at block 706, a user may select the modify option (202, FIG. 2) of the exemplary menu (200, FIG. 2).

At block 708, a table element selection is received. This occurs when the user selects a table element from the listing of table elements 306 in the table elements tile 304 of the exemplary dialog 300 (FIG. 3). The user's manual entry of formatting characteristics is received at block 710. If a preview 312 is implemented, the preview is updated with the new formatting and is displayed at block 712.

If the user enters another table element to format ("Yes" branch, block 714), then the process repeats from block 708. If the user does not select another table element to format ("No" branch, block 714), then a table style name is received at block 716. In at least one implementation, if a table style name is not entered, the table style that was retrieved via the table style toolbar will be saved with the name previously associated therewith.

At block 718, the table style is stored in memory and is associated with the table style name entered in block 716.

Exemplary Operating Environment

Figure 8:
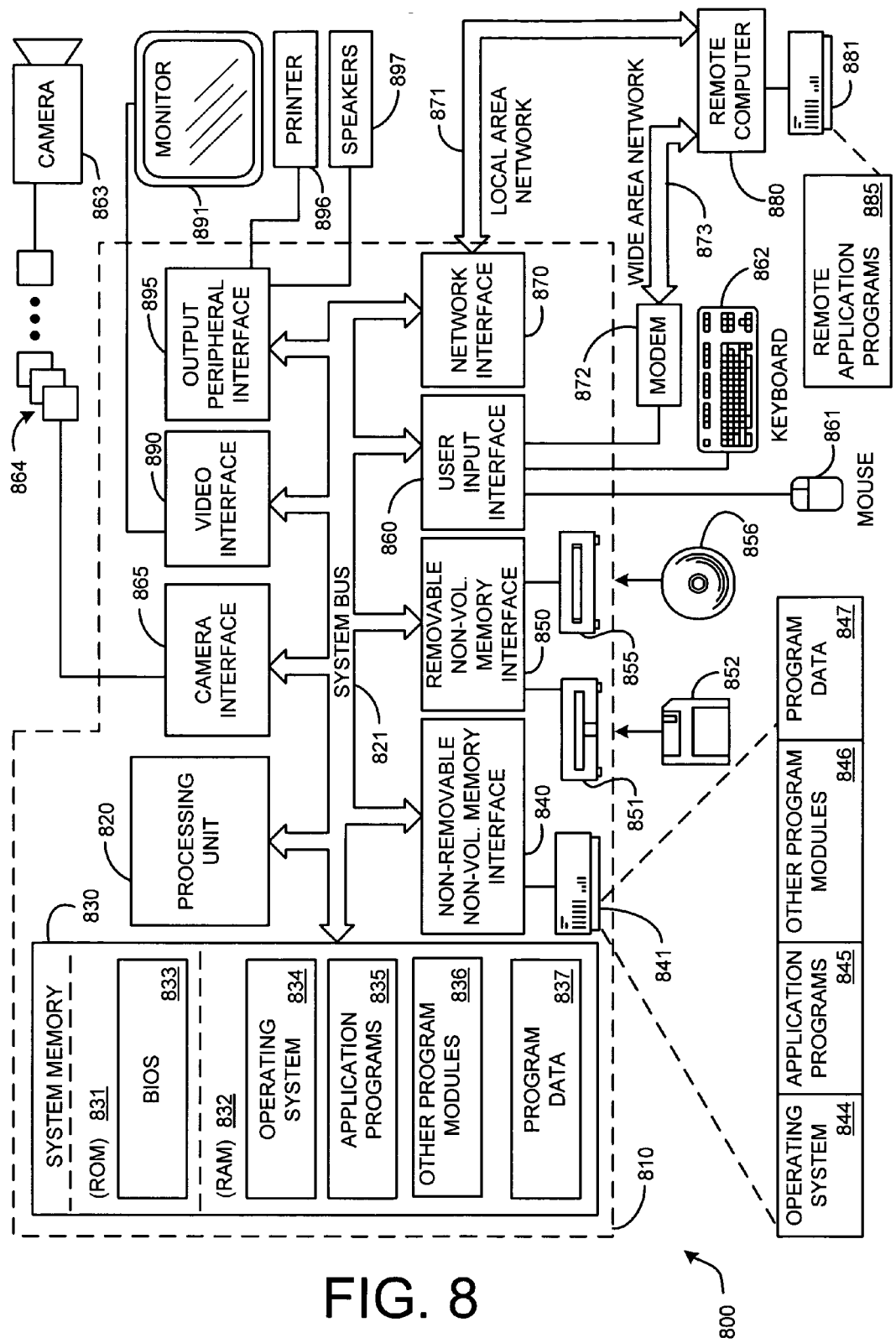
FIG. 8 is a block diagram depicting an exemplary general purpose computing device that may be used in conjunction with one or more implementations described herein.

FIG. 8 is a block diagram depicting a general purpose computing environment 800 that may be used in one or more implementations according to the present description. The computing system environment 800 is only one example of a suitable computing environment and is not intended to suggest any limitation as to the scope of use or functionality of the claimed subject matter. Neither should the computing environment 800 be interpreted as having any dependency or requirement relating to any one or combination of components illustrated in the exemplary operating environment 800.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures and/or program. Combinations of the any of the foregoing should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVD), digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895. A camera 863 (such as a digital/electronic still or video camera, or film/photographic scanner) capable of capturing a sequence of images 864 can also be included as an input device to the personal computer 810. Further, while just one camera is depicted, multiple cameras could be included as an input device to the personal computer 810. The images 864 from the one or more cameras are input into the computer 810 via an appropriate camera interface 865. This interface 865 is connected to the system bus 821, thereby allowing the images to be routed to and stored in the RAM 832, or one of the other data storage devices associated with the computer 810. However, it is noted that image data can be input into the computer 810 from any of the aforementioned computer-readable media as well, without requiring the use of the camera 863.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Conclusion

While one or more exemplary implementations have been illustrated and described, it will be appreciated that various changes can be made therein without departing from the spirit and scope of the claims appended hereto.

The invention claimed is:

1. A method, comprising:
   displaying, by a computing device, a table style user interface, the displaying comprising presenting a table style for a table comprising a plurality of cells;
   receiving a selection from the table style user interface
   displaying, by the computing device in response to the receiving the selection, a list of a plurality of word phrases that indicate table elements that each represent an area of the table, where each area represents a group of cells of the table's plurality of cells, and where the list of the plurality of word phrases is ordered in an order of precedence;
   receiving formatting instructions;
   formatting the table according to the received formatting instructions;
   resolving any incompatible formatting of a cell of the table resulting from the formatting according to the order of precedence of the plurality of word phrases, the any incompatible formatting further resulting from at least two of the table elements overlapping the cell.

2. The method as recited in claim 1, further comprising identifying whether formatting instructions of a cell of a lower precedence table element are compatible with formatting instructions of a cell of higher precedence table element.

3. The method as recited in claim 1, further comprising displaying a preview thumbnail image that shows an exemplary table formatted according to the received formatting instructions.

4. The method as recited in claim 1, further comprising displaying a table styles tool bar that includes a plurality of thumbnail images that includes a representation of the table style, each of the plurality of thumbnail images illustrating a corresponding one of a plurality of table styles.

5. The method as recited in claim 4, wherein the receiving the selection of the table style is based on a user selecting a thumbnail image of the plurality of thumbnail images, the selected thumbnail image corresponding to the table style.

6. The method as recited in claim 5, further comprising temporarily applying the selected table style to the table.

7. The method as recited in claim 1, wherein the formatting the cells of the higher precedence table element takes precedence over the formatting the cells of the lower precedence table element based on at least a portion of the cells of the higher precedence table element overlapping at least a portion of the cells of the lower precedence table element.

8. The method as recited in claim 1, wherein the selection of the table style is made by selecting the table style from a table styles toolbar of the table style user interface.

9. The method as recited in claim 1, further comprising applying formatting modifications to the table according to cell overlap of a table element with any others of the plurality of table elements and according to the order of precedence.

10. At least one computer-readable storage medium comprising an article of manufacture that includes executable-instructions that, when executed by a computing device, cause the computing device to display a graphical user interface on a display device, the graphical user interface comprising:
 a table styles toolbar configured for displaying a selectable thumbnail image of a table style and for displaying a list of a plurality of word phrases that indicate table elements that each represent an area of the table, and where each area represents at least one cell of the plurality of cells;
 a selectable modify option; and
 a dialog comprising a list of the plurality of word phrases and configured for receiving a selection, the list of the plurality of word phrases arranged in an order of precedence, and where formatting of cells of a higher precedence table element takes precedence over formatting of cells of a lower precedence table element.

11. The at least one computer-readable storage medium as recited in claim 10, the graphical user interface further comprising the table styles tool bar further configured to, after a selection of the selectable thumbnail image, temporarily apply the table style to a selected table.

12. The at least one computer-readable storage medium as recited in claim 10, the graphical user interface further comprising a table name field configured to receive a name of a table and to associate the table via the name with the table style.

13. The at least one computer-readable storage medium as recited in claim 10, wherein the order or precedence is customizable.

14. The at least one computer-readable storage medium as recited in claim 10, wherein each of the plurality of table elements includes a customizable formatting specification.

15. The at least one computer-readable storage medium as recited in claim 10, wherein the formatting of the cells of the higher precedence table element takes precedence over the formatting of cells of the lower precedence table element in response to at least a portion of the cells of the higher precedence table element overlapping at least a portion of the cells of the lower precedence table element.

16. At least one computer-readable storage medium containing executable instructions that, when executed by a computing device, cause the computing device to perform a method comprising:
 receiving a user selection from the table style user interface
 displaying, in response to the receiving the selection, a list of a plurality of word phrases that indicate table elements that each represent an area of the table, where each area represent a group of cells of a plurality of cells of a table, and where the list of the plurality of word phrases is ordered in an order of precedence;
 receiving at least one formatting modification;
 receiving a selection from the table elements, where formatting of cells of a higher precedence table element takes precedence over formatting of cells of a lower precedence table element; and
 applying the at least one formatting modification to the selected table element.

17. The at least one computer-readable storage medium as recited in claim 16, wherein the user selection of the table style is made by selecting the table style from a table style toolbar of a user interface.

18. The at least one computer-readable storage medium as recited in claim 16, wherein the applying the at least one formatting modification to the selected table element includes applying the at least one formatting modification according to overlap of the table element with any other table element and the order of precedence.

19. The at least one computer-readable storage medium as recited in claim 18, further comprising determining if formatting of overlapping table elements is compatible.

20. The at least one computer-readable storage medium as recited in claim 16, wherein the order or precedence is customizable.

21. The at least one computer-readable storage medium as recited in claim 16, wherein each of the plurality of table elements includes a customizable formatting specification.

22. The at least one computer-readable storage medium as recited in claim 16, wherein the formatting of the cells of the higher precedence table element takes precedence over the formatting of cells of the lower precedence table element in response to at least a portion of the cells of the higher precedence table element overlapping at least a portion of the cells of the lower precedence table element.

* * * * *